United States Patent [19]

Goldbach

[11] 3,991,584
[45] Nov. 16, 1976

[54] SHOCK ABSORBING AND RETRACTING SYSTEM FOR PIPE LAYING VESSEL
[75] Inventor: Henry T. Goldbach, Seattle, Wash.
[73] Assignee: Western Gear Corporation, Everett, Wash.
[22] Filed: Jan. 31, 1975
[21] Appl. No.: 545,795

[52] U.S. Cl.................................. 61/111; 254/172
[51] Int. Cl.².................... F16L 1/00; B63B 35/04
[58] Field of Search ............ 61/72.1, 72.3; 254/172, 254/173 R

[56] References Cited
UNITED STATES PATENTS

| | | | |
|---|---|---|---|
| 3,311,351 | 3/1967 | Blakely | 254/172 |
| 3,512,281 | 5/1970 | Hadjidakis | 254/172 X |
| 3,728,865 | 4/1973 | Lochridge | 61/72.3 |
| 3,762,358 | 10/1973 | Hinkle | 61/72.3 X |
| 3,851,492 | 12/1974 | Cannon et al. | 61/72.3 X |
| 3,866,555 | 2/1975 | Korkut | 61/72.3 X |

Primary Examiner—Paul R. Gilliam
Assistant Examiner—David H. Corbin
Attorney, Agent, or Firm—Seed, Berry, Vernon & Baynham

[57] ABSTRACT

A pipe laying vessel having pipe tensioners on deck for paying out and pulling pipe and a constant tension winch below deck for abandoning or recovering pipe is provided with a shock-absorbing sheave assembly to adjust the tension in the cable between the pipe and the winch during instantaneous load changes. The sheave assembly is also retractable below the deck for pipe handling operations on the deck immediately above the lowered sheave assembly.

8 Claims, 5 Drawing Figures

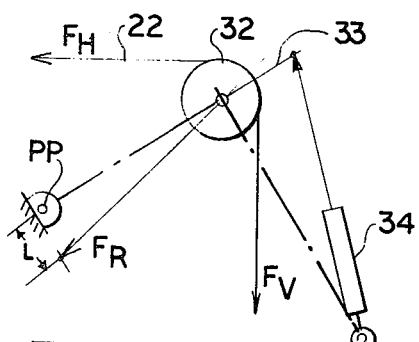
FIG. 5
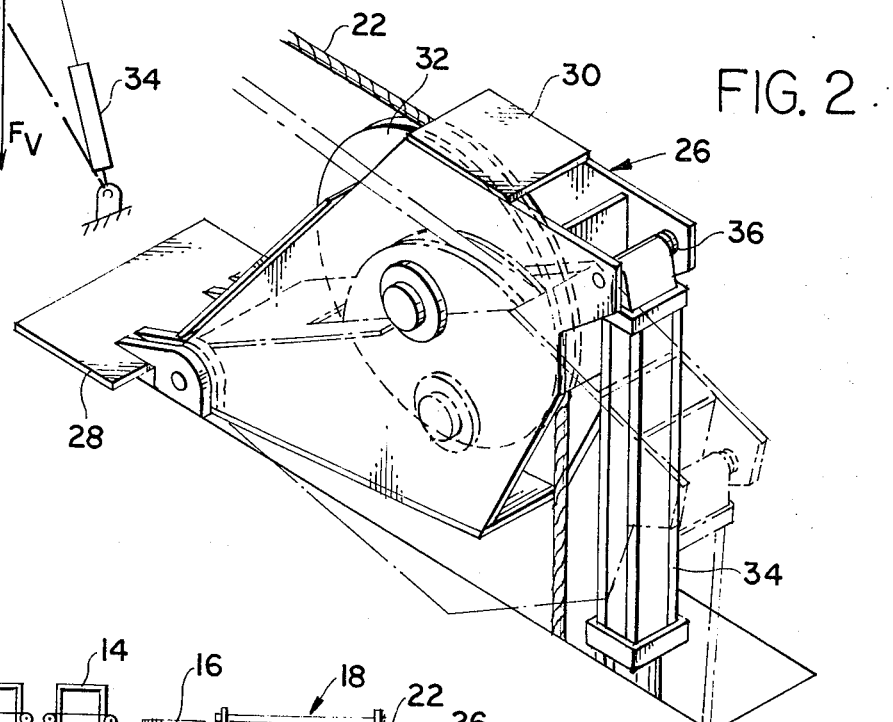
FIG. 2
FIG. 1
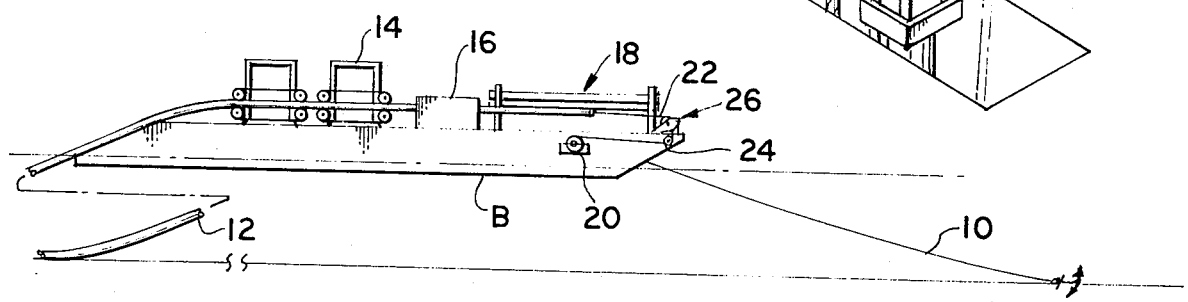
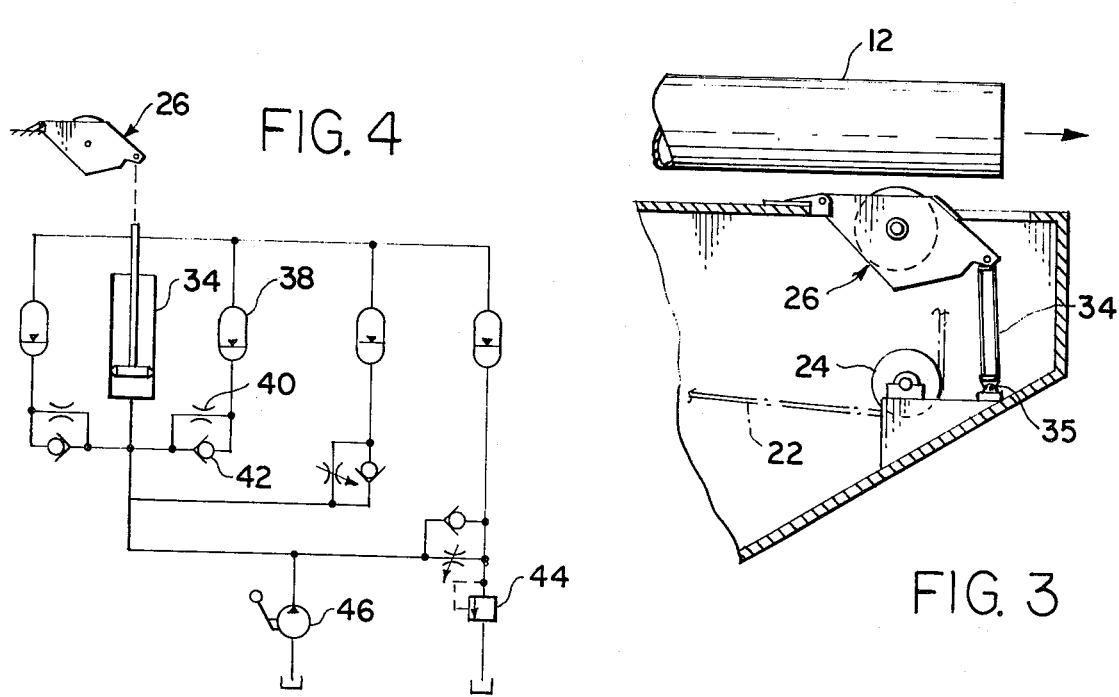
FIG. 4
FIG. 3

SHOCK ABSORBING AND RETRACTING SYSTEM FOR PIPE LAYING VESSEL

BACKGROUND OF THE INVENTION

1. Field of the Invention

This invention pertains to pipe laying vessels and, more particularly, to constant tension winch/pipe handling systems on board such vessels.

2. Description of the Prior Art

Pipe laying vessels, usually in the form of barges, are maintained in accurate navigational positions generally by a plurality of anchors on the ocean floor or, in some cases, by computerized propulsion systems aboard the vessel itself. These vessels are extremely expensive to manufacture. As a necessary incidence to the laying of pipe from a vessel, one or more pipe tensioners, welders, and other pipe handling and storage equipment must be provided on top of the deck of the vessel. Each additional piece of equipment which must be added above deck has generally required the lengthening of the deck at the high cost.

One accessory piece of equipment necessary on a pipe laying vessel is a constant tension winch for abandonment and recovery of pipe during bad weather conditions. Although the constant tension winch has conventional internal control mechanisms which tend to maintain the tension on the cable and thus on the pipe connected to the cable at a generally constant tension loading, changes in cable loading caused by vessel oscillations from wave and wind actions frequently exceed the stress limit of the cable and the capability of the winch to maintain the constant tension in the pipe.

SUMMARY OF THE INVENTION

It is an object of this invention to provide a compensating sheave for absorbing the temporary fluctuations in loading of a pipe suspended from a vessel.

It is another object of this invention to provide a retractable force absorbing system for a pipe laying vessel which assists the winch in maintaining constant tension on the pipeline but which can be moved quickly and easily out of the line of pipe travel when the winch and cable are not in operation.

It is another object of this invention to provide a shock-absorbing sheave assembly for a constant tension winch and cable which is less expensive to build and occupies a minimum amount of usable space on the vessel.

Basically, these objects are obtained by providing a sheave assembly pivotally mounted on the deck and between the pipe and the constant tension winch such that pivotal movement of the sheave will add to or subtract from the travel of the cable between the pipe and the winch. The pivotal movement of the sheave assembly is controlled by a pressure sensing control which allows movement of the sheave in response to variations in the tension of the cable connected to the pipe. The sheave assembly can be pivoted out of the line of pipe travel, commonly called "the firing line," preferably through an opening in the deck. In this manner, movement of the pipe in its line of travel on deck, such as either into the pipe tensioner or out of the pipe tensioner, is unimpeded by the presence of the sheave and prevents damaging changes to the pipe catenary and damage to the pipe and the sheave assembly in the event that pipe being pulled into the vessel exceeds the normal forward movement due to slippage of the vessel's anchoring system or the like.

If desired, the "stroke" or amount of pivotal movement of the sheave assembly can be increased and a standard non-constant tension winch employed, with the uniform tension on the pipe being maintained solely by the sheave assembly.

The shock-absorbing capability of the sheave assembly provides a highly responsive supplement to the constant tensioning controls of the winch to maintain the cable in a more generally constant tension condition under rapid and high loading fluctuations. The sheave assembly is comparatively small relative to other equipment on the vessel and, being storable below deck, allows for utilization of space on the existing vessel rather than to have to extend the length of the vessel.

BRIEF DESCRIPTION OF THE FIGURES OF THE DRAWING

FIG. 1 is a schematic side elevation of a typical pipe laying barge embodying the principles of the invention.

FIG. 2 is a fragmentary isometric of the sheave assembly of this invention.

FIG. 3 is an operational section illustrating the retracted position of the sheave assembly.

FIG. 4 is a typical hydraulic schematic for positioning the sheave assembly.

FIG. 5 is a schematic force diagram illustrating one of the advantageous concepts of the invention.

DESCRIPTION OF THE PREFERRED EMBODIMENTS

As best shown in FIG. 1, a pipe laying barge B is provided with conventional anchor lines 10 which hold the barge while pipe 12 is being laid on the ocean floor. As is the customary practice, the barge is provided with one or more pipe tensioners 14 and an automatic welder 16 positioned along a line of pipe travel just aft of a pipe feeding region 18. The pipe feeding region 18 in the preferred embodiment is generally over the longitudinal center of the vessel, with sections of pipe being moved laterally into the line of pipe travel into alignment with the pipe in the welder 16 and then fed aft through the welder and coupled to the pipeline 12. Also provided on the barge is a conventional constant tension winch 20 which can be coupled to the pipeline by a wire rope or cable 22. The winch is preferably below deck, although it can be on deck and to the side of the line of pipe travel, with the cable running around a fixed sheave 24 and over the sheave assembly 26 of this invention.

A preferred embodiment of the sheave assembly 26 is best illustrated in FIGS. 2 and 3 and includes a pivot block 28 suitably welded to the deck of the vessel and a pivotal housing 30 pivotally mounted to the pivot block 28. A conventional sheave 32 is rotatably mounted in the housing 30 along an imaginary line 33 passing through the pivot point PP of the sheave assembly. As is best shown in FIG. 5, the configuration of the cable tension forces (illustrated as forces $F_H$ and $F_V$) as the cable passes over the sheave 32 results in a resultant force $F_R$ which is offset from the pivot point PP a distance L. This offset immediately causes a clockwise moment on the sheave assembly from the tension in the cable, tending to pivot the sheave assembly in the direction of cable movement toward the constant tension winch 20.

In order to support the remote end of the sheave assembly against the force moment and to provide for pivotal movement of the sheave assembly to compensate for transient changes in the cable tension, a hydraulic ram or actuator 34 is pivotally mounted, as at 35, to the vessel below deck and has its piston rod connected to the remote end of the sheave assembly as at 36. Pressurized fluid is directed to the underside of the piston in the cylinder 34 from a plurality of gas-liquid accumulators 38. Each of the lines between the accumulators and the cylinder is provided with a flow restriction valve 40 and a check valve 42. The valves provide rapid compression or downward movement of the sheave assembly but slower extension of the sheave assembly. The accumulators preload the cylinder 34 to a desired normal tension in the line, in one example, 300,000 pounds, with fluctuations in tension above the preset load being absorbed by the movement of the sheave assembly. In the example illustrated, the maximum oscillation stroke of the sheave assembly provides for approximately three feet of cable movement or slack. Preferably, the gas side of the accumulators 38, for this example, would hold a nitrogen charge of approximately 900 psi, with each accumulator having a capacity of approximately 40 gallons. Alternatively, of course, a single 40 gallon size would also be suitable. The cylinder can be drained by a valve 44 which allows the piston rod to completely retract into the stowed position, as shown in FIGS. 3 and 4. In this position, pipe 22, as shown in FIG. 3, can readily be moved over the deck above the sheave assembly. A suitable replenishment pump 46 is provided to fill the cylinder when the sheave is again brought into operation.

In pipe laying operation, the cable is dead-ended at the sheave assembly and the sheave assembly retracted while pipe is being added or removed from the pipeline. This operation will occur initially at the pipe handling region 18 above deck, either directly over or just aft of the sheave assembly. At intervals when the pipe is moved more forward, as where an anchor slips, the sheave assembly will, of course, be out of the path of the pipe, thus protecting the pipe against damage. More importantly, however, the sheave assembly is protected from damage and the movement of the pipe in the tensioners remains unimpeded and avoids changes in the desired catenary in the pipe. When the pipe is to be abandoned, the cable is fastened to a hook on the end of a cap welded to the end of the pipe, the sheave assembly preloaded to its position above deck, and the tension of the pipe gradually transferred from the pipe tensioner to the constant tension winch in a known manner, such as described in Bell, U.S. Pat. application Ser. No. 491,314, filed July 24, 1974. The cable is then played out until the pipe rests on the bottom of the ocean and a cable attached to a buoy for later recovery.

While the preferred embodiments of the invention have been illustrated and described, it should be understood that variations will be apparent to one skilled in the art without departing from the principles herein. Accordingly, the invention is not to be limited to the specific embodiment illustrated.

The embodiments of the invention in which a particular property or privilege is claimed are defined as follows:

1. A cable shock-absorbing system for use in combination with a pipe laying vessel having a pipe handling deck, including a line of pipe travel above the deck, at least one pipe tensioner on the deck, a winch removed from said line of pipe travel and a cable operatively connected between the winch and the pipe during periods when the winch is activated, the improvement comprising:
a sheave assembly pivotally mounted on said deck, a cable sheave rotatably mounted on said sheave assembly for receiving cable passing above said deck in said line of pipe travel and directing the cable out of said line of pipe travel toward said winch, extensible actuating means coupled to said sheave assembly for controlling pivotal movement of said sheave assembly, and control means controlling the extension and retraction of said actuating means in response to changes in cable tension for swinging said sheave assembly in the direction of cable movement toward the winch during increases in cable tension and in the direction of cable movement away from the winch during decreases in cable tension whereby transient changes in the tension in the cable can be absorbed to maintain an approximately constant tension in the cable.

2. The combination of claim 1, said control means including means for retracting said actuating means for pivoting the sheave assembly out of the line of pipe travel whereby the sheave assembly is clear of the line of pipe travel during periods when the pipe is disconnected from said winch.

3. The combination of claim 1, said sheave assembly including pivot means coupled to said deck, said cable producing forces acting on said sheave, said forces producing a resultant force which is offset from said pivot means in a direction toward said actuating means whereby the resultant force is directed to normally bias the sheave assembly in a direction toward the winch.

4. The combination of claim 2, said sheave assembly including pivot means coupled to said deck, said cable producing forces acting on said sheave, said cable forces producing a resultant force which is offset from said pivot means in a direction to normally bias the sheave assembly toward the winch.

5. The combination of claim 4, said control means including pressure accumulating means for storing pressure responsive to increases in cable tension and returning the pressure to the actuating means when cable tension is reduced to return the sheave to its normal operating location.

6. The combination of claim 2, said deck having an opening below said sheave assembly, said actuating means being retractable below said deck for moving said sheave assembly below deck out of said line of pipe travel.

7. The combination of claim 1, said winch being a constant tension winch.

8. A shock-absorbing sheave assembly on a pipe laying vessel having a pipe handling deck, a pipe tensioner on said deck, a pipeline carried in said pipe tensioner for movement along a line located above said deck, and a constant tension winch below deck having a cable for coupling to the pipe in said pipe tensioner, said sheave assembly including a sheave pivotally mounted on said deck for movement out of said line above said deck to a storage position below said deck and for varying the length of cable between the winch and the pipeline, an extendable hydraulic actuator for providing limited swinging movement of said sheave, and a pressure control for extending and retracting said hydraulic actuator in response to changes in the tension in said pipeline to allow movement of said sheave in order to vary the length of cable and maintain a constant tension in the pipeline.

* * * * *